United States Patent [19]

Eyster

[11] Patent Number: 5,333,190
[45] Date of Patent: Jul. 26, 1994

[54] TELEPHONE RING DETECTION METHOD AND APPARATUS

[76] Inventor: Kurt G. Eyster, 1824 Beacon St., Apt. 1, Brookline, Mass. 02146

[21] Appl. No.: 821,966

[22] Filed: Jan. 15, 1992

[51] Int. Cl.5 .............................................. H04M 1/00
[52] U.S. Cl. .................................... 379/375; 379/180; 379/164
[58] Field of Search ............... 379/372, 373, 375, 377, 379/387, 179, 180, 102, 104, 105, 356, 164

[56] References Cited

U.S. PATENT DOCUMENTS

| | | | |
|---|---|---|---|
| 4,146,754 | 3/1979 | Rose | 379/179 X |
| 4,701,949 | 10/1987 | Lynch et al. | 379/179 |
| 4,720,853 | 1/1988 | Szlam | 379/373 X |
| 4,723,271 | 2/1988 | Grundtisch | 379/179 X |
| 4,959,853 | 9/1990 | Del Monte et al. | 379/180 |
| 4,998,273 | 3/1991 | Nichols | 379/373 X |
| 5,062,133 | 10/1991 | Melrose | 379/102 X |

Primary Examiner—James L. Dwyer
Assistant Examiner—Magdy Shehata
Attorney, Agent, or Firm—Wolf, Greenfield & Sacks

[57] ABSTRACT

A ring detection device adapted to be connected in a telephone line to a telephone or telephone device. The device includes circuitry for distinguishing between several differently encoded telephone ring signals and enabling and/or maintaining disablement of the telephone or telephone device to which it is connected based upon such distinction. The device includes a switch for selecting which of the incoming telephone ring signals the telephone or telephone device to which is it connected is enabled.

32 Claims, 5 Drawing Sheets

TELEPHONE RING DETECTION METHOD AND APPARATUS

BACKGROUND OF THE INVENTION

1. Field of the Invention

The present invention relates generally to telephone ring detection devices and pertains, more particularly to devices for distinguishing between several differently encoded telephone ring signals and enabling disabled telephone devices in response to desired encoded telephone ring signals.

2. Background

In most households occupants share use of a single telephone line. As such, it has become increasingly desirable, in the field of such use, to provide a system by which the occupants may determine for whom an incoming call is intended. In response to this desire, New England Telephone Company offers the "RingMate Service" TM in which users of a single telephone line may be provided with three different phone numbers. The "RingMate Service" TM provides a different telephone ring signal for each of the three different phone numbers, all on one telephone line, when an incoming call is received. For example, an incoming call on a first phone number may provide one ring, while an incoming call on a second phone number may provide two rings, and while an incoming on a third phone number may provide three rings. In this way, three different users of a single telephone line may be able to distinguish between incoming calls based upon the number of the rings. It is to be appreciated, that the tone of the rings may alternatively be the distinguishing feature.

There is, however, one drawback associated with the "RingMate Service" TM. This drawback is the fact that each telephone in a household connected up to the single line will ring for incoming calls on each of the three different phone numbers. Thus, although a particular incoming call may not be intended for a particular person, that person's phone will still ring, and it is up to the people receiving the calls to listen and distinguish between rings. It is desirable for users of this service, and similar services offered by other telephone companies, to be able to select certain telephones to ring in response to incoming calls on one phone number and others to ring in response to incoming calls on other phone numbers.

Accordingly, it is an object of the present invention to provide an improved service over the prior art "RingMate Service" TM and other comparable services.

It is a further object of the present invention to provide a service which will, in conjunction with the "RingMate Service" TM or other comparable services, allow users of a single telephone line system to select which telephone devices will respond to which incoming calls.

As used herein, the term "telephone devices" refers to any device which may connect up to the telephone line including, but not limited to, telephones, answering machines, fax machines and computing machines.

SUMMARY OF THE INVENTION

To accomplish the foregoing and other objects, features and advantages of the invention, there is provided a ring detection and telephone enabling/disabling apparatus adapted to be connected to a telephone device which comprises an input for receiving any of several differently encoded telephone ring signals, means for distinguishing between the several differently encoded telephone ring signals, and means for providing a different output signal for each of the several differently encoded telephone ring signals. The apparatus further includes a manual switch means for providing manual control of the enablement of the telephone device in response to one of the differently encoded telephone ring signals, and means, controlled by the switch means, responsive to the output signals, for enabling the telephone device when one of the differently encoded telephone ring signals is received and maintaining disablement of the telephone device when another of the differently encoded telephone ring signals is received.

In an alternate preferred embodiment of the present invention, the device includes means controlled by the switch means, responsive to the output signals for enabling the telephone ring signal when one of the differently encoded telephone ring signals is received and maintaining disablment of the telephone ring signal when another of the differently encoded telephone ring signals is received. Enablment of the telephone ring signal means that the particular telephone ring signal is allowed to pass through to the particular telephone or telephone device.

The means for distinguishing includes a ring detection chip in series with an optoisolator chip, wherein the optoisolator chip produces an output which includes a series of square wave signals. The means for providing a different output signal includes a counter in series with the output of the optoisolator. The apparatus further includes timing circuitry for monitoring the timing of the enablement of the telephone device or telephone ring signal.

BRIEF DESCRIPTION OF THE DRAWINGS

Numerous other objects, features and advantages of the invention should now become apparent upon a reading of the following detailed description taken in conjunction with the accompanying drawing, in which.

DETAILED DESCRIPTION OF THE PREFERRED EMBODIMENT

In accordance with the present invention there is provided a ring detection device which is adapted to be connected to a telephone device within the telephone line for use with the "RingMate Service" TM or a similar service. The device includes a switch to manually control to which incoming calls the telephone device, to which it is connected, will respond. The device includes circuitry, which can distinguish between several differently encoded telephone ring signals and, in response to the position of the manual switch, enable the telephone device or send the ring signal through to the telephone device in response to incoming calls, to which it is connected, when the appropriate telephone ring signal is received and leave disabled the telephone device or keep the ring signal from reaching the telephone device when another of the telephone ring signals is received.

Figure 1:
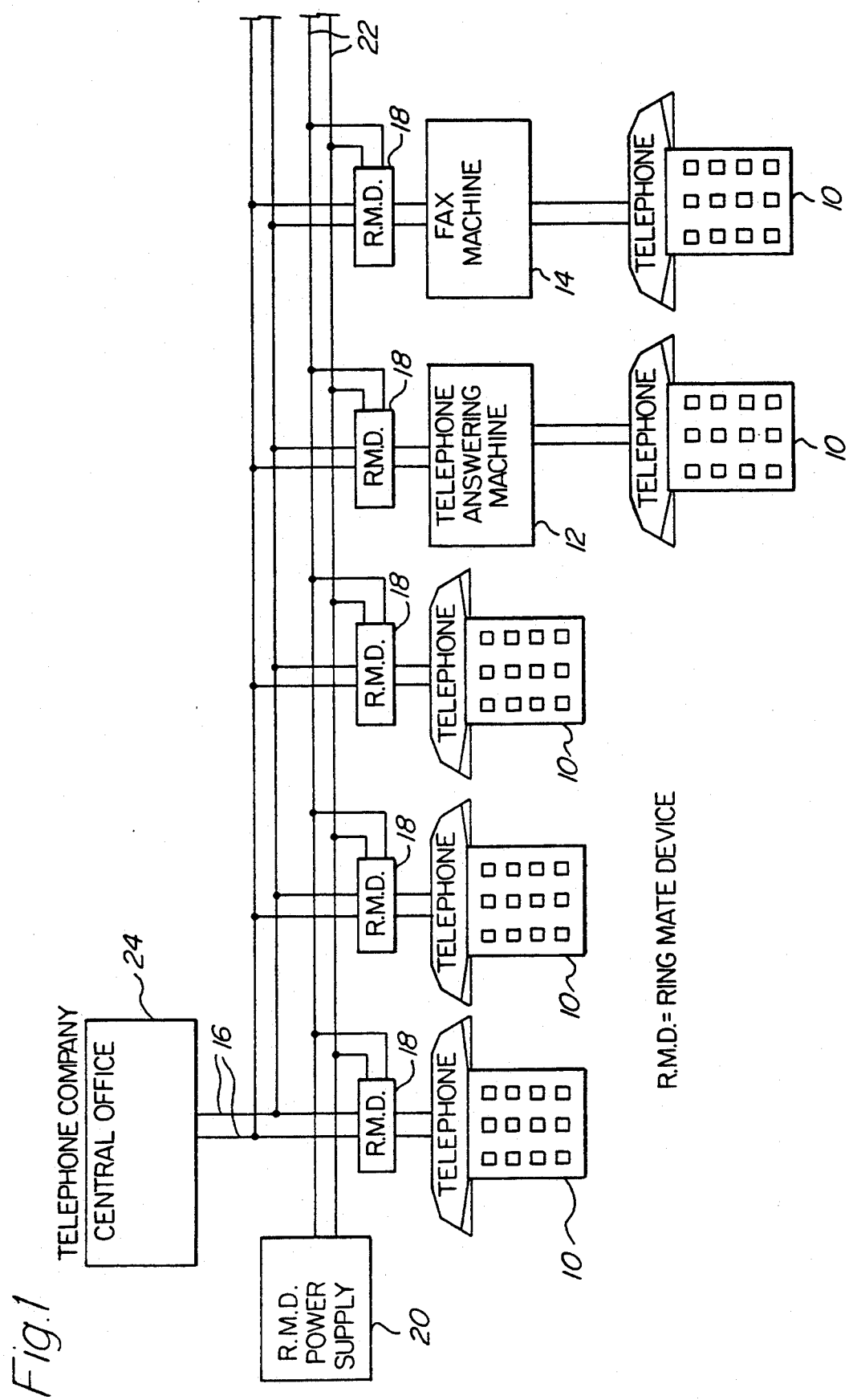
FIG. 1 is a block diagram of a single telephone line system including the ring detection device according to the present invention.

Reference is now made to the drawings and in particular to the preferred embodiment of the present invention illustrated as a system in FIG. 1. Details of the operation of each particular ring detection device according to a first embodiment of the present invention are illustrated in the flow chart of FIG. 2. Further details of the components of the ring detection device according to the first embodiment are illustrated in the electrical schematic diagram of FIG. 3. Details of the operation of each particular ring detection device according to an alternate preferred embodiment of the present invention are illustrated in the flow chart of FIG. 4. Further details of the components of the ring detection device according to this preferred alternate embodiment are illustrated in the electrical schematic diagram of FIG. 5.

FIG. 1 illustrates a typical single telephone line system including the "RingMate Service" TM or similar service and having ring detection devices according to the present invention. As illustrated, the system includes five telephones 10. The system also includes answering machine 12 and fax machine 140 The system further includes five ring detection devices 18, according to the present invention. These ring detection devices 18 are connected through the telephone line 16 to each of the telephone devices. It is to be appreciated that telephone line 16, as shown, actually includes two separate wires. As illustrated, a single power supply 20 is used to power each of the ring detection devices 18 which are connected in parallel along power rail 22. It is to be appreciated that each of the ring detection devices 18 include two wires which are used to connect to the power rail 22. However, an alternative arrangement is envisioned in which each ring detection device 18 includes its own separate power supply. Single telephone line 16 eminates from a central office of the telephone company 24.

As aforementioned, each of the ring detection devices 18 includes a switch with positions for selecting among which incoming calls the particular telephone device, to which it is connected, will respond. During operation, an incoming call would be received along telephone line 16 from central office 24 and run to each of the five ring detection devices 18. When the ring detection devices are powered, each telephone device is disabled to which it is connected. Each ring detection device would then determine which of the encoded telephone ring signals it has received. Each device would then enable the telephone device to which it is connected if the switch is in a position in which enablement is selected for this particular telephone ring.

Figure 2:
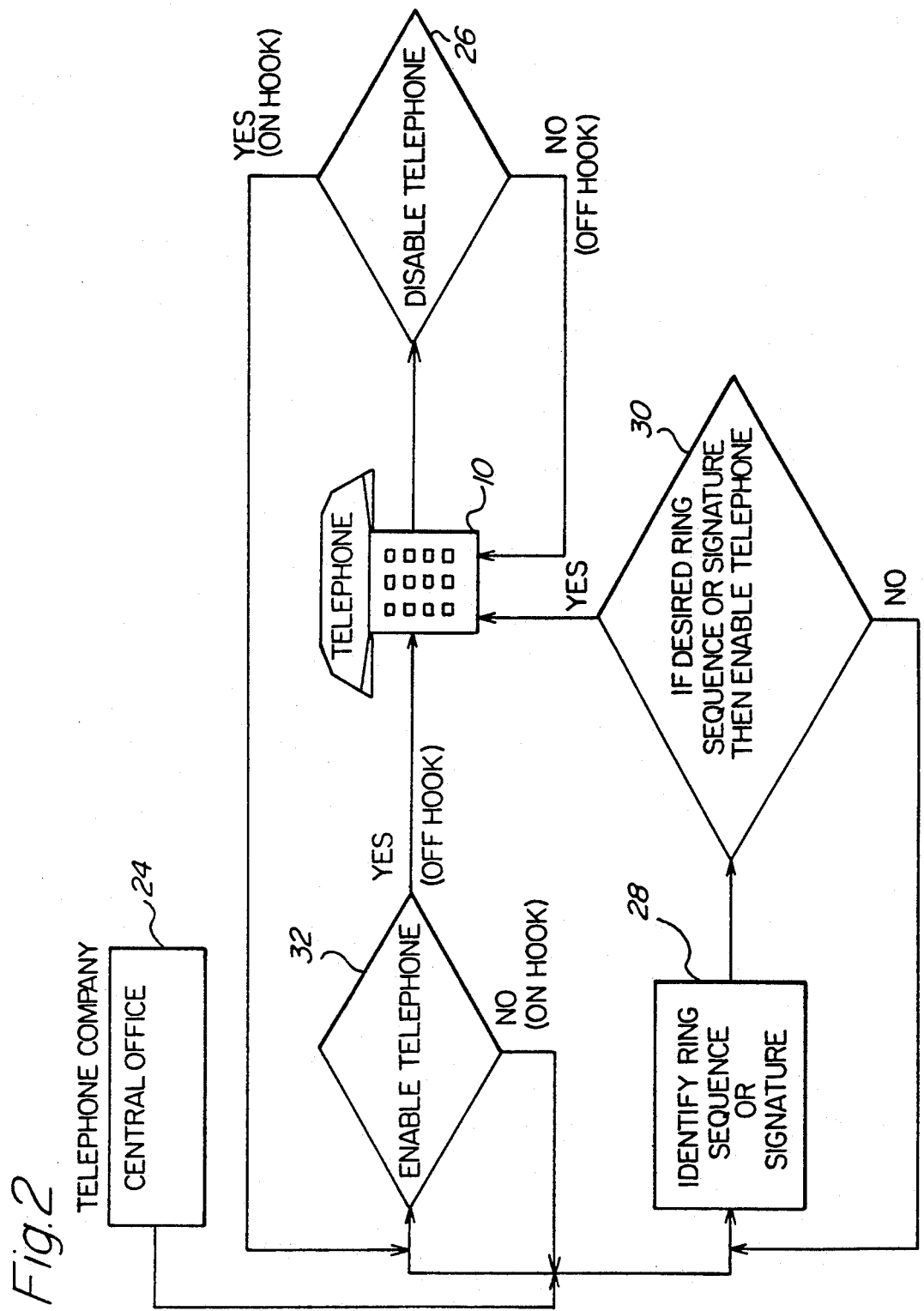
FIG. 2 is a flow chart illustrating the operation of the ring detection device according to a first embodiment of the present invention.

Referring now to FIG. 2, a flow chart of the operation of a first embodiment ring detection device of the present invention is illustrated. As illustrated, an incoming call will be received from the central office of the telephone company 24. At this time, telephone 10 is disabled as illustrated at block 26. A telephone ring signal is received by a ring detection device and the telephone ring signal is identified at block 28. If this telephone ring signal is the desired telephone ring signal, as determined by the position of the manual switch, then the telephone is enabled and the ring signal is allowed to pass to the telephone as illustrated at block 30. When the telephone is enabled, the telephone will ring. If the telephone ring signal is not the desired telephone ring signal, then the telephone will remain disabled and the ring signal will not be allowed to pass to the telephone. When the phone stops ringing, it is either because the call has stopped or the phone is picked up. If the phone is picked up, it will be off-hook and the ring detection device will not disable (except momentarily) the telephone as illustrated in block 26. If the phone is still on-hook and no one has picked it up yet, then the ring detection device will disable the telephone as illustrated in block 26. If the phone is off-hook and someone is speaking and the phone is momentarily disabled by the ring detection device, it will immediately be enabled as illustrated in block 32. If the phone remains on-hook, it will not be enabled as illustrated in block 32. It is to be appreciated that the telephone 10 as illustrated in FIG. 2 may also include any telephone device.

Figure 3:
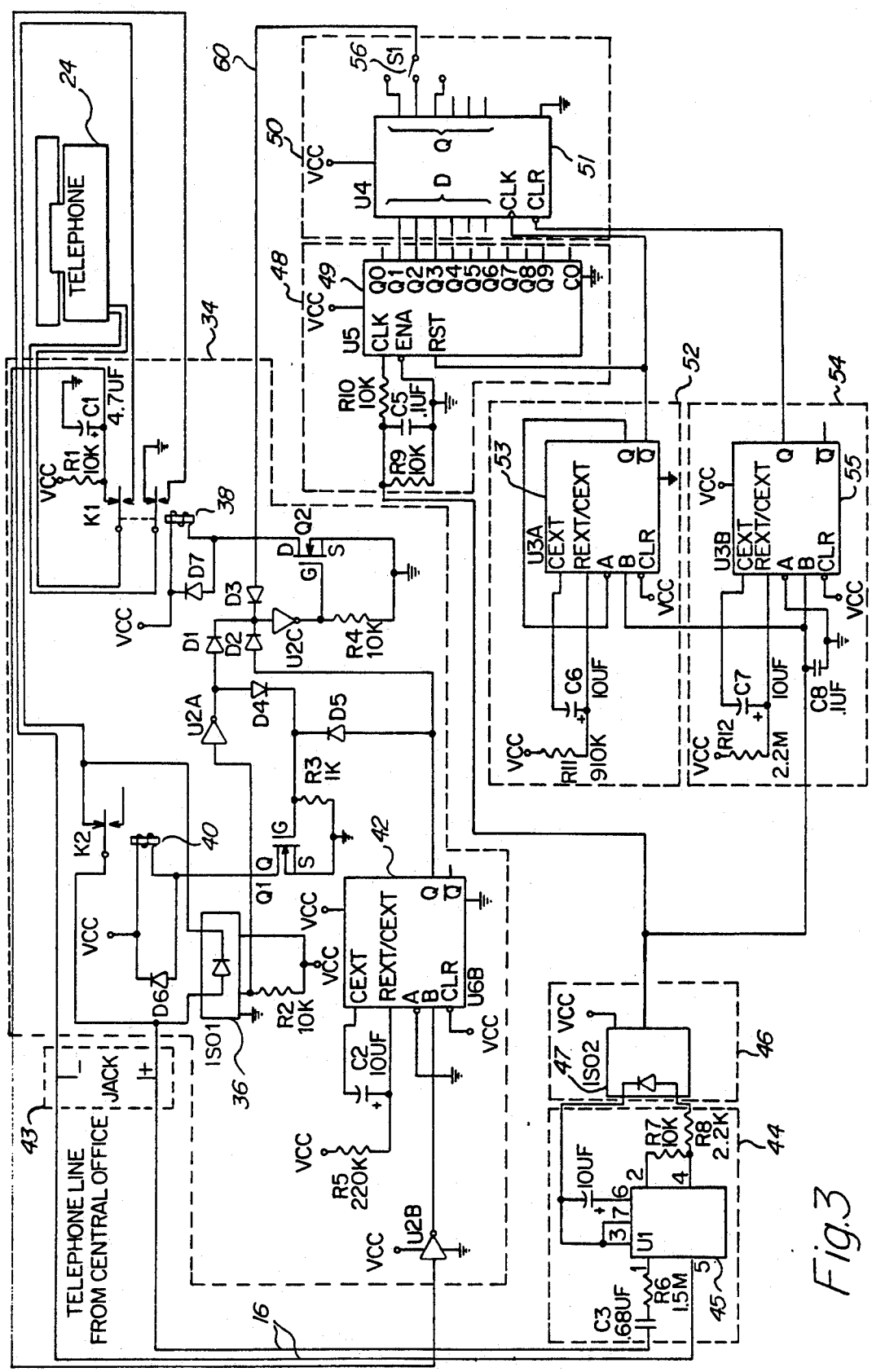
FIG. 3 is a schematic diagram of the circuitry of the ring detection device according to a first embodiment of the present invention.

Referring now to FIG. 3, a schematic diagram of the electrical components of the ring detection device according to this first embodiment is illustrated. A description of the components along with their operation follows. The ring detection device is connected in the telephone line between the central office of the telephone company and the telephone 24 or telephone device. The connection is made to telephone line 16 by conventional telephone jack 43.

The device includes enabling/disabling circuitry 34. When the telephone ring signal is received through telephone line 16 from the telephone company central office it is received by enabling/disabling circuitry 34 which includes a relay initially in a disabling position. Enabling/disabling circuitry 34 includes optoisolator chip 36, relays 38 and 40 and timing chip 42. As aforementioned, when powered enabling/disabling circuitry 34 disables telephone 24. This disablement is due to the fact that relay 38 is electrically held in the position to disable the phone (disconnect telephone from telephone line). When power is lost, the phone will go back on and is enabled according to normal operation. The ring detection device may be powered from a conventional AC outlet (via a transformer) or may receive direct DC power in the form of a back-up battery. Enabling/disabling circuitry 34 acts to enable and maintain enablement of the telephone when the telephone is used to make an outgoing call. Additionally, enabling/disabling circuitry 34 acts to either enable the telephone when a desired incoming call is received or maintain disablement of the telephone when a desired incoming call is not received. Enabling/disabling circuitry 34 receives power everywhere in the circuit where it is labeled VCC. VCC is preferably 5 volts DC.

At the same time the incoming telephone ring signal is received by ring detection circuitry 44. Ring detection circuitry 44 includes ring detection chip 45. Ring detection circuitry also includes the convention R-C network with ring detection chip 45, as illustrated. Ring detection chip 45 produces approximately a five volt output at pin 4. This approximate five volt output is used to drive square wave signal generator circuitry 46.

Square wave signal generator circuitry 46 includes optoisolator chip 47. Optoisolator chip 47 conventionally produces square wave signals which have characteristics related to that of the incoming telephone ring signal. For example if the incoming telephone ring signal has only one ring associated therewith, optoisolator chip 47 will produce one square wave. If the incoming telephone ring signal has two rings associated therewith, optoisolator chip 47 will produce two square waves, and so on. It is to be appreciated, however, that the incoming telephone ring signals may differ in terms of the tone rather than the number of rings. If this is the case, instead of employing a ring detection chip, a tone decoder would be employed and the number of square waves produced by optoisolator chip 47 would depend on the frequency (tone) of the incoming telephone ring signal.

This series of square wave signals is accepted by counting circuitry 48. Counting circuitry 48 includes counter chip 49 along with the R-C network which is inputted to the clock and enable inputs of counter chip 49. In a preferred embodiment of the present invention, counter chip 49 is a decade counter/divider which has ten decoded outputs which are normally low, and go high only if they are appropriate decimal time periods. Counter chip 49 essentially counts the number of square waves and has three outputs, Q1, Q2 and Q3 which correspond to the three potential count totals (corresponding to the three different telephone ring signals). For a system in which more than three different telephone ring signals exist, the counter will provide more outputs, one corresponding to each counter total. Any of the three potential outputs are inputted to transfer circuitry 50. Transfer circuitry 50 includes D flip-flop chip 51 (which acts as a latch) and manual switch 56. The three potential outputs of counting circuitry 48 are inputted to the three D flip-flops in D flip-flop chip 51 which transfers them to the outputs of the three D flip-flops when a clock signal is received. As illustrated, manual switch 56 has three positions corresponding to any of the outputs of the three D flip-flops in D flip-flop chip 51. The switch will connect any one of these three outputs to the enabling/disabling circuitry 34 along line 16.

Timing circuitry 52, including timing chip 53, produces a 4 second window which is a period of time long enough for the full telephone ring signal to be received and detected, and have the proper outputs inputted to the D flip-flops. At this time, timing chip 53 sends a signal to counter chip 49 which resets the counter and sends a signal to the clock input of D flip-flop chip 51 which causes the inputs to be transferred to the outputs of the D flip-flop chip. Timing chip 53, which is part of timing circuitry 52, is non-retriggerable. In other words, when the 4 second window elapses, the signals are sent out to the counter chip and to the clock input of the D flip-flop chip.

Timing circuitry 54, which includes timing chip 55, produces a 6 second window, which is retriggered unless the incoming ring signal ceases and sends a signal to the clear input of D flip-flop chip 51 at this time. At this point, all the outputs to the D flip-flop are cleared. Timing chip 55 is retriggerable. This is so that the 6 second window will start over when another ring is received. In other words, when an incoming call is received and it is ringing and no one has picked up, and the time between the rings is less than 6 seconds so that the timing chip 55 will be retriggered and the 6 second window will start over. When someone either picks up and the phone goes off-hook or the incoming caller hangs up and no more rings are received, the 6 second window will lapse and the D flip-flop outputs will be cleared. Thus, no signal will be sent through the switch to the enabling/disabling circuitry 34 and the phone will be turned off momentarily if it is picked up or remain disabled if it is not picked up, as will be described below.

It is to be appreciated, that for one particular incoming telephone ring signal, only one of the three outputs of counter chip 49 will produce a signal. Therefore, only one of the inputs and thus, outputs of D flip-flop chip 51 will have a signal thereat. Switch 56 will be in one of the three positions and if this coincides with the output of the D flip-flop where a signal is present, then this signal will be inputted to enabling/disabling circuitry 34 along line 60. Otherwise, no signal will be inputted to enabling/disabling circuitry 34.

When a signal is received at enabling/disabling circuitry 34, then the telephone device will be enabled by the circuitry and the ring will be allowed to go through to this particular telephone.

In this manner, the manual switch may select among which one of the three incoming telephone ring signals to enable the telephone or telephone device. If this particular telephone ring signal is received, then the circuitry will enable the telephone or telephone device and allow the ring signal to go through.

Operation of the first embodiment enabling/disabling circuitry 34, as illustrated in FIG. 3, will be described below. First, enabling/disabling circuitry 34 will be described with reference to an outgoing call. For a rotary dial phone, every time a number is dialed, voltage impulses are produced. Between impulses, with no signal present, the phone has a normal tendency with enabling/disabling circuitry to shut off. Timer 42 maintains the phone enabled for 800 milliseconds, which is a long enough time period to allow for ten impulses, which is the most number of impulses produced by any one number dialed. The phone will turn off momentarily after 800 milliseconds and will turn on again for the next number dialed, at which point the timer will keep the phone on for 800 milliseconds. When the final number is dialed, the signal is sent out. Timer 42 maintains the phone enabled for 800 milliseconds by triggering the relays into the enabling positions.

For dialing a touchtone phone, when the phone is picked up, timer 42 is triggered, which in turn triggers the relays 38 and 40 to the enabling positions. At this point, current is running through optoisolator 36 which holds both relays in the enabling position. It is to be appreciated, that optoisolator 36 has a diode which allows for low amperage current therethrough. This is so that when many phones on one system are picked up, and the current amperage is greatly reduced, the optoisolator will still be operable. A diode in optoisolator 36 allows current ranging from 0.5 milliamps to 100 milliamps. When the phone is hooked to the phone company, only one element remains in the phone line circuitry, this element being the optoisolator. Relay 40 is connected within the optoisolator and relay 38 acts as a short circuit to the phone line.

In a pulse tone dial phone, after the number is dialed, the phone is disabled momentarily when no signal is present, and it is turned right back on due to the 800 millisecond clock within timer 42.

Operation for incoming calls for this first embodiment enabling/disabling circuitry will be described hereinafter. As aforementioned, the phone is initially disabled when the circuitry is powered. When a signal comes through the switch and is sent to enabling/disabling circuitry 34, which corresponds to a desired telephone ring signal, relay 38 is turned on (to the enabling position), which enables the telephone to which it is connected and then the telephone rings. At this point if no one answers the telephone (it remains on-hook) and the telephone stops ringing, after a 6 second lapse, the D flip-flops will be cleared, and no signal will be sent to the enabling/disabling circuitry. At this point, relay 38 is turned off which disables the telephone. Alternatively, if someone answers the telephone, after a 6 second lapse, the D flip-flops will be cleared, no signal will be sent to enabling/disabling circuitry, and relay 38 will be turned off momentarily. At this point, clock 42 turns both relays back on for 800 milliseconds, and the current through the optoisolator will maintain both relays on (in the enabling position) and the phone can operate normally.

Figure 4:
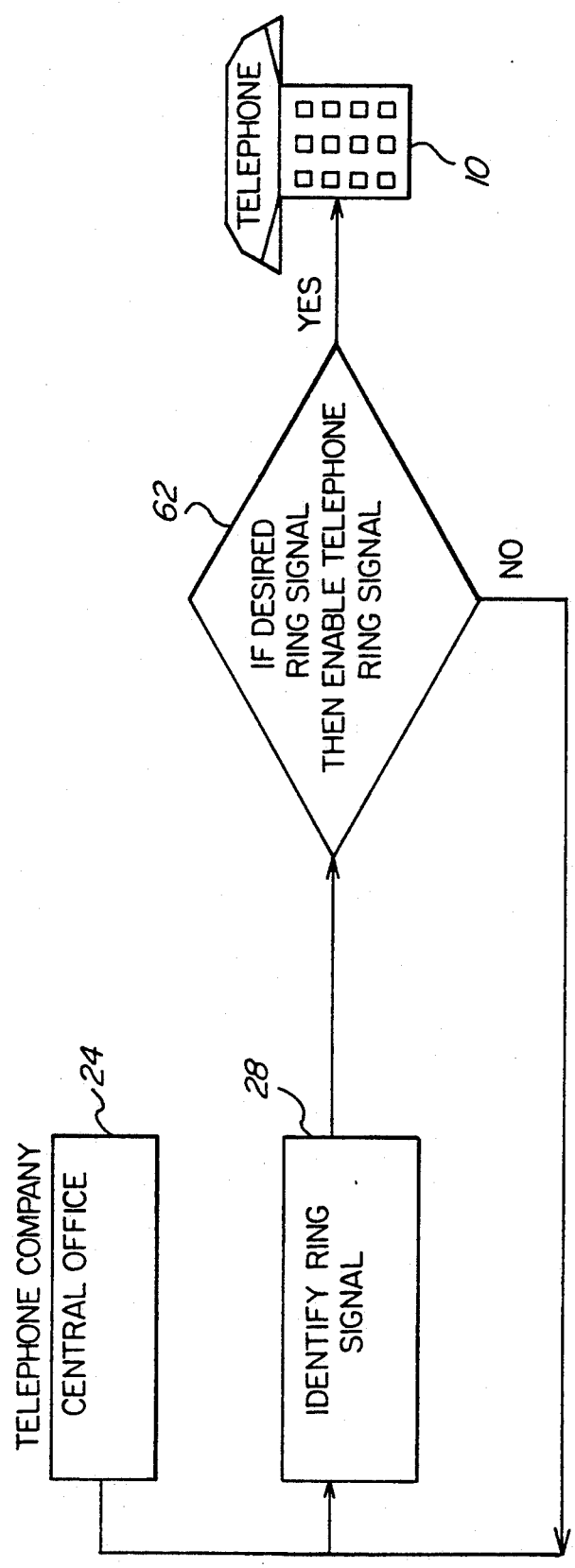
FIG. 4 is a flow chart illustrating the operation of the ring detection device according to an alternate embodiment of the present invention.

Referring now to FIG. 4, a flow chart of the operation of the preferred alternate embodiment of the ring detection device is illustrated. With this alternate embodiment, any of three or more encoded telephone ring signals will be received from the telephone company 24. With this alternate embodiment, the telephone 10 stays enabled, unlike the first embodiment. When a telephone ring signal is received the telephone ring signal is identified at block 28. Once the ring signal is identified at block 28, then if it is the desired ring signal, the ring signal is allowed to go through to the telephone and the telephone will ring, as shown at block 62. If the ring signal is not the desired ring signal, then the ring signal is not allowed to go to the telephone as also illustrated at block 62. It is to be appreciated that this alternate preferred embodiment differs from the first embodiment described, in that the telephone is maintained enabled the whole time but the telephone ring signal is either allowed to go through to the telephone or is not allowed to go through to the telephone. This is referred to as enabling the telephone ring signal.

Figure 5:
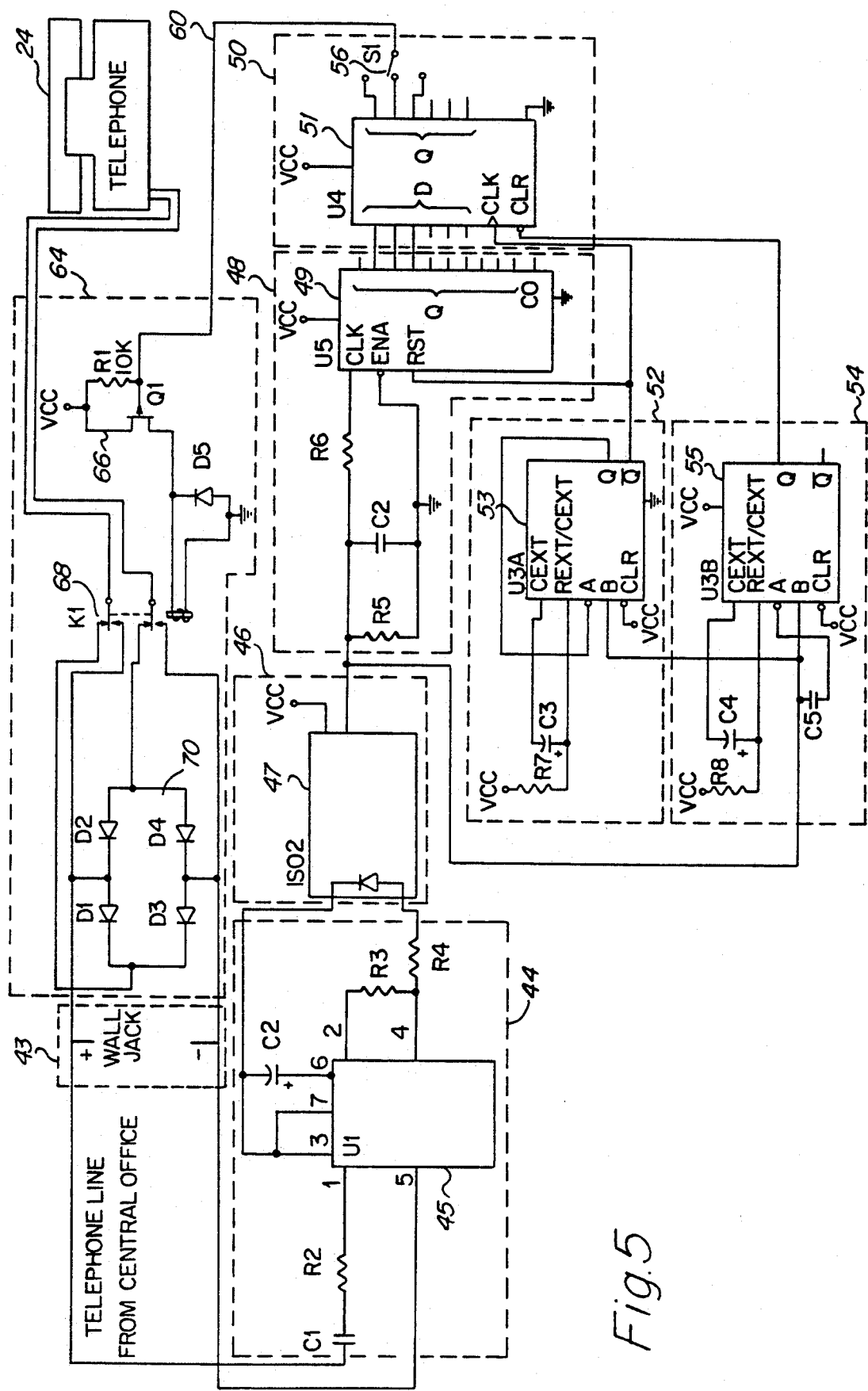
FIG. 5 is a schematic diagram of the circuitry of the ring detection device according to an alternate embodiment of the present invention.

Referring now to FIG. 5, a schematic diagram of the alternate preferred embodiment of the present invention is illustrated. Please note that the circuitry illustrated in this alternate embodiment schematic diagram of FIG. 5 is exactly the same as the first embodiment of the schematic diagram as illustrated in FIG. 3 except for the enabling/disabling circuitry. The enabling/disabling circuitry 64, as illustrated in FIG. 5 for the preferred embodiment, simply replaces the enabling/disabling circuitry 34 as illustrated in FIG. 3 for the first embodiment. Only the enabling/disabling circuitry 64 of this preferred alternate embodiment of FIG. 5 will be described. The remaining portions of the schematic diagram have been aforedescribed with reference to the first embodiment of FIG. 3.

Enabling/disabling circuitry 64 includes full wave rectifier bridge circuit 70, relay 68, and transistor 66. It is to be appreciated that telephone 24 remains enabled during complete operation of the device. When no signal was present on line 60, the transistor 66 holds relay 68 in the on position which maintains full wave rectifier bridge 70 in the phone line between wall jack 43 and telephone 24. When a signal is received along line 60, transistor 66 turns relay 68 off which in turn causes a short circuit between wall jack 43 and telephone 24, thereby completely bypassing full wave rectifier bridge 70.

Therefore, when an incoming call is received, a telephone ring signal will come from the central office of the telephone company through telephone wall jack 43. This telephone ring signal will proceed to run through full wave rectifier bridge circuit 70 and an smoothed rectified wave will appear at phone 24. When on hook, the phone acts as an open circuits to DC. Therefore, phone 24 will not ring at this point. At the same time, the telephone ring signal will proceed through the bottom portion of the circuitry beginning with ring detection circuitry 44, which operates as above-described. When a signal is received at line 60, corresponding to a desired telephone ring signal received, transistor 66 turns relay 68 off which effectively creates a short circuit between wall jack 43 and telephone 24. At this point, the telephone ring signal will take this short path to telephone 24, which will ring in response.

It is to be appreciated, in this preferred embodiment, that telephone 24 is enabled during this whole procedure. Therefore, any outgoing calls from telephone 24 would proceed normally.

Although this has been described with reference to a system in which only three different ring signals are available, it is envisioned that this system may be adapted for any number of different ring signals.

Having now described a limited number of embodiments of the invention, it should now be apparent to those skilled in the art that numerous other embodiments modifications thereof are contemplated as falling within the scope of the present invention as defined by the appended claims.

What is claimed is:

1. A ring detection and telephone enabling/disabling apparatus comprising:
   an input for receiving any of several differently encoded telephone ring signals;
   means for distinguishing between said several differently encoded telephone ring signals;
   means for providing a different output signal for each of said several differently encoded telephone ring signals;
   manual switch means for providing manual control of the enablement of said telephone device in response to one of said differently encoded telephone ring signals; and
   means, controlled by said switch means, responsive to said output signals, for enabling said telephone device when said one of said differently encoded telephone ring signals is received and maintaining disablement of said telephone device when another of said differently encoded telephone ring signals is received;
   wherein said means for distinguishing includes a ring detection chip in series with an optoisolator chip, wherein said differently encoded telephone ring signals each include a different number of rings and wherein said optoisolator chip produces an output of a series of square wave signals having characteristics related to the received encoded telephone ring signal.

2. A ring detection and telephone enabling/disabling apparatus as claimed in claim 1 wherein said means for providing a different output signal includes a counter chip in series with the output of said optoisolator chip which counts said square wave signals and produces a different output signal for each different count total, each different output signal corresponding to each of said several differently encoded telephone ring signals, 3. A ring detection and telephone enabling/disabling apparatus as claimed in claim 2 further including timing circuitry for monitoring the timing of the enablement of said telephone device.

4. A ring detection and telephone enabling/disabling apparatus as claimed in claim 3 wherein said timing circuitry includes at least one timing chip which tests whether the telephone ring signals are being received and produces at least one control signal in response to said testing.

5. A ring detection and telephone enabling/disabling apparatus as claimed in claim 4 further including several flip-flops connected in series between said counter chip and said switch means for transferring said different output signals from said counter chip to said switch means.

6. A ring detection and telephone enabling/disabling apparatus as claimed in claim 5 wherein said at least one timing chip produces at least one control signal which acts to enable or clear said flip-flops.

7. A ring detection and telephone enabling/disabling apparatus as claimed in claim 6 wherein said flip-flops are D flip-flops.

8. A ring detection and telephone enabling/disabling apparatus as claimed in claim 7 wherein said switch means includes several positions for connecting any one of the different output signals from said D flip-flops to said means for enabling and maintaining disablement of said telephone device.

9. A method for detecting telephone rings and for enabling and disabling a telephone device in response to said detection and comprising the steps of:
receiving any of several differently encoded telephone ring signals;
distinguishing between said several differently encoded telephone ring signals;
providing a different output signal for each of said several differently encoded telephone ring signals;
accepting control from manual switch means which controls the enabling of said telephone device in response to one of said differently encoded telephone ring signals; and
enabling said telephone device when said one of said differently encoded telephone ring signals is received and maintaining disablement of said telephone device when another of said differently encoded telephone ring signals is received;
wherein the step of distinguishing is carried out by a ring detection chip in series with an optoisolator chip, wherein said differently encoded telephone ring signals each include a different number of rings and further including the step, carried out by said optoisolator chip, of producing an output of a series of square wave signals having characteristics related to the received encoded telephone ring signal.

10. A method for detecting telephone rings and for enabling and disabling a telephone device as claimed in claim 9 wherein the step of providing a different output signal includes the steps of counting said square wave signals and producing a different output signal for each different count total, each different output signal corresponding to each of several differently encoded telephone ring signals, and wherein the steps of counting and producing are carried out by a counter chip.

11. A method for detecting telephone rings and for enabling and disabling a telephone device as claimed in claim 10 further including the step of monitoring the timing of the enablement of said telephone device.

12. A method for detecting telephone rings and for enabling and disabling a telephone device as claimed in claim 11 wherein the step of monitoring the timing includes the steps of testing whether the telephone ring signals are being received and producing at least one control signal in response to said testing, wherein the steps of monitoring and testing are carried out by at least one timing chip.

13. A method for detecting telephone rings and for enabling and disabling a telephone device as claimed in claim 12 further including the step of transferring said different output signals from said counter chip to said switch means, wherein the transferring is carried out by several flip-flops.

14. A method for detecting telephone rings and for enabling and disabling a telephone device as claimed in claim 13 further including the step of enabling or clearing the flip-flops in response to the control signal produced.

15. A method for detecting telephone rings and for enabling and disabling a telephone device as claimed in claim 14 wherein said flip-flops are D flip-flops.

16. A method for detecting telephone rings and for enabling and disabling a telephone device as claimed in claim 15 wherein the step of accepting control includes the step of accepting the connection, by said switch means, of any one of the different output signals from said D flip-flops to said means for enabling and maintaining disablement of said telephone device.

17. A ring detection and telephone ring enabling/disabling apparatus adapted to be connected to a telephone device and comprising:
an input for receiving any of several differently encoded telephone ring signals;
means for distinguishing between said several differently encoded telephone ring signals;
means for providing a different output signal for each of said several differently encoded telephone ring signals;
manual switch means for providing manual control of the enablement of said telephone device in response to one of said differently encoded telephone ring signals; and
means, controlled by said switch means, responsive to said output signals, for enabling said telephone ring signal when said one of said differently encoded telephone ring signals is received and maintaining disablement of said telephone ring signal when another of said differently encoded telephone ring signals is received;
wherein said means for distinguishing includes a ring detection chip in series with an optoisolator chip, wherein said differently encoded telephone ring signals each include a different number of rings and wherein said optoisolator chip produces an output of a series of square wave signals having characteristics related to the received encoded telephone ring signal.

18. A ring detection and telephone ring enabling/disabling apparatus as claimed in claim 17 wherein said means for providing a different output signal includes a counter chip in series with the output of said optoisolator chip which counts said square wave signals and produces a different output signal for each different count total, each different output signal corresponding to each of said several differently encoded telephone ring signals.

19. A ring detection and telephone ring enabling/disabling apparatus as claimed in claim 18 further including timing circuitry for monitoring the timing of the enablement of said telephone ring signal.

20. A ring detection and telephone ring enabling-/disabling apparatus as claimed in claim 19 wherein said timing circuitry includes at least one timing chip which tests whether the telephone ring signals are being received and produces at least one control signal in response to said testing.

21. A ring detection and telephone ring enabling-/disabling apparatus as claimed in claim 20 further including several flip-flops connected in series between said counter chip and said switch means for transferring said different output signals from said counter chip to said switch means.

22. A ring detection and telephone ring enabling-/disabling apparatus as claimed in claim 21 wherein said at least one timing chip produces at least one control signal which acts to enable or clear said flip-flops.

23. A ring detection and telephone ring enabling-/disabling apparatus as claimed in claim 22 wherein said flip-flops are D flip-flops.

24. A ring detection and telephone ring enabling-/disabling apparatus as claimed in claim 23 wherein said switch means includes several positions for connecting any one of the different output signals from said D flip-flops to said means for enabling and maintaining disablement of said telephone ring signal.

25. A method for detecting telephone rings and for enabling and disabling a telephone ring in response to said detection and comprising the steps of:
receiving any of several differently encoded telephone ring signals;
distinguishing between said several differently encoded telephone ring signals;
providing a different output signal for each of said several differently encoded telephone ring signals;
accepting control from manual switch means which controls the enabling of said telephone ring signal in response to one of said differently encoded telephone ring signals; and
enabling said telephone ring signal when said one of said differently encoded telephone ring signals is received and maintaining disablement of said telephone ring signal when another of said differently encoded telephone ring signals is received;
wherein the step of distinguishing is carried out by a ring detection chip in series with an optoisolator chip, wherein said differently encoded telephone ring signals each include a different number of rings and further including the step, carried out by said optoisolator chip, of producing an output of a series of square wave signals having characteristics related to the received encoded telephone ring signal.

26. A method for detecting telephone rings and for enabling and disabling a telephone ring as claimed in claim 25 wherein the step of providing a different output signal includes the steps of counting said square wave signals and producing a different output signal for each different count total, each different output signal corresponding to each of several differently encoded telephone ring signals, and wherein the steps of counting and producing are carried out by a counter chip.

27. A method for detecting telephone rings and for enabling and disabling a telephone ring as claimed in claim 26 further including the step of monitoring the timing of the enablement of said telephone ring signal.

28. A method for detecting telephone rings and for enabling and disabling a telephone ring as claimed in claim 27 wherein the step of monitoring the timing includes the steps of testing whether the telephone ring signals are being received and producing at least one control signal in response to said testing, wherein the steps of monitoring and testing are carried out by at least one timing chip.

29. A method for detecting telephone rings and for enabling and disabling a telephone ring as claimed in claim 28 further including the step of transferring said different output signals from said counter chip to said switch means, wherein the transferring is carried out by several flip-flops.

30. A method for detecting telephone rings and for enabling and disabling a telephone ring as claimed in claim 29 further including the step of enabling or clearing the flip-flops in response to the control signal produced.

31. A method for detecting telephone rings and for enabling and disabling a telephone ring as claimed in claim 30 wherein said flip-flops are D flip-flops.

32. A method for detecting telephone rings and for enabling and disabling a telephone ring as claimed in claim 31 wherein the step of accepting control includes the step of accepting the connection, by said switch means, of any one of the different output signals from said D flip-flops to said means for enabling and maintaining disablement of said telephone ring signals.

* * * * *